UNITED STATES PATENT OFFICE 2,543,391

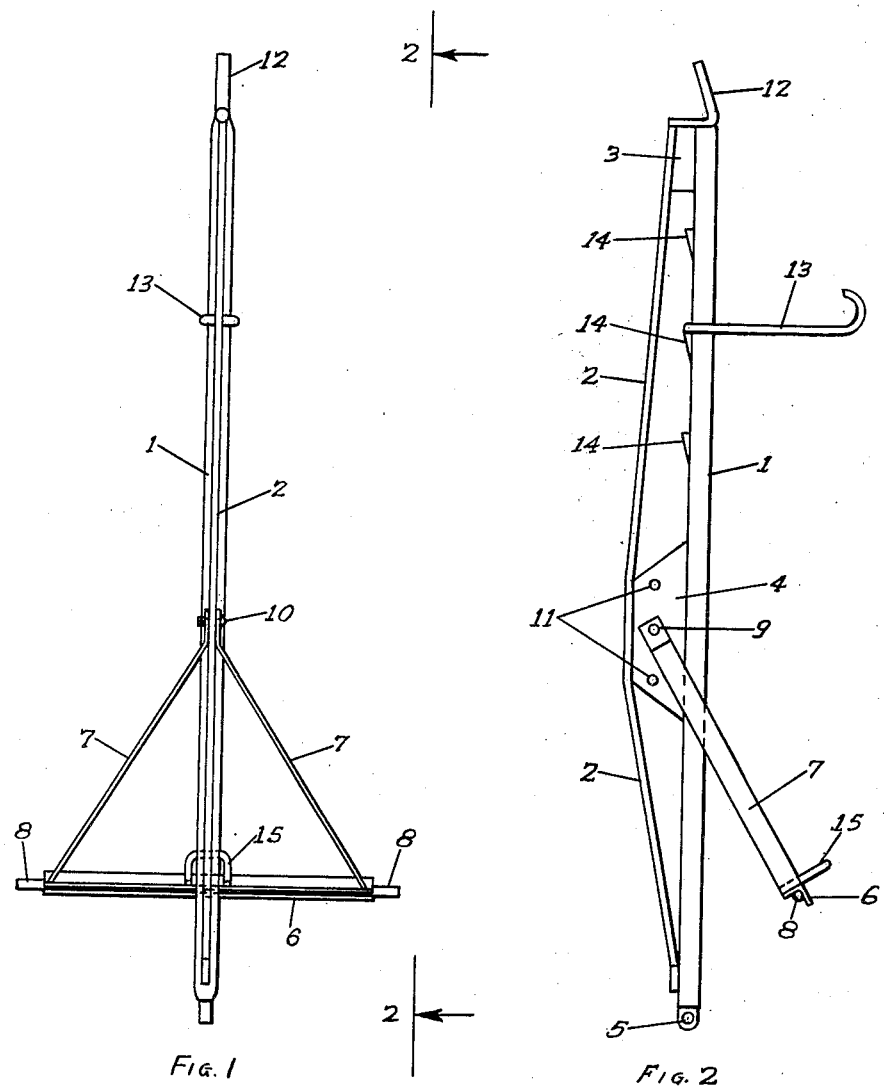

CRANE FOR ATTACHMENT TO TRACTORS

John H. Walker and Clarence W. Crenshaw, Beaumont, Tex.

Application March 9, 1948, Serial No. 13,998

1 Claim. (Cl. 212—144)

The invention concerns a crane which is adapted to be attached to a tractor and which is interchangeable with other tractor drawn tools and implements.

In the construction of certain types of tractors it is common practice to support tools and implements of different kinds from the rear of the tractor at three different points. The tractor may be equipped with a pair of rearwardly extending drawbars, for example, which are pivotally mounted at their forward ends and the rearward ends of which may be raised and lowered hydraulically. The arrangement is such that the rearward ends of the drawbars lie at all times in the same horizontal plane, and the usual practice is to pivotally support the tool from the rearward ends of the drawbars. The third point of support for the tool is usually above and between the rearwardly extending drawbars, the tool being pivotally secured to the rearward end of a link which is pivotally secured at its forward end to the frame of the tractor.

The device of the invention is adapted for use in connection with a structure of the type described. More particularly the invention concerns a crane which is adapted to be supported from the rear of a tractor in the manner described and which is interchangeable with other tractor drawn tools and implements.

It is an object of the invention to provide a tractor operated crane which may be actuated by the hydraulic lift mechanism of the tractor.

It is a further object of the invention to provide a tractor accessory of the type described which may be readily attached to and removed from a tractor and which is interchangeable with other tractor drawn tools and implements.

It is also an object of the invention to provide a tractor operated crane which is characterized by a high degree of versatility and which affords a maximum of convenience to the operator.

Another object of the invention is to provide a tractor operated crane which is relatively simple in construction and may be manufactured inexpensively.

Another object of the invention is to provide a tractor operated crane which, although it is of relatively light weight, is sturdy, rugged and dependable in operation and requires a minimum of maintenance.

The invention will be readily understood by referring to the following description and the accompanying drawing, in which:

Fig. 1 is a plan view of the device as viewed from the top thereof.

Fig. 2 is a side elevation taken on the line 2—2 of Fig. 1.

Referring to the drawing, the device of the invention includes a boom which is formed by a tubular member 1 and stiffening means comprising a reenforcing rod 2 and gusset plates 3 and 4. The gusset plates 3 and 4 are secured to one side of the tubular member 1 and extend upwardly therefrom, the gusset plate 3 being positioned adjacent one end of the tubular member 1 and the gusset plate 4 being positioned intermediate the ends of the tubular member 1. The reenforcing rod 2 is secured at one end to the tubular member 1 and at the other end to one side of the gusset plate 3, and is supported intermediate its ends by the gusset plate 4, the gusset plate 4 being wider than the gusset plate 3. The reenforcing rod 2 is bent around the gusset plate 4 and is secured to one side thereof.

One end of the tubular member 1 is flattened and an opening 5 is formed therein, the arrangement being such that the end of the tubular member 1 may be pivotally secured directly to the frame of a tractor, no intermediate linkage being required.

A triangular frame comprising an angle iron 6 and a pair of bars 7 is provided for supporting an intermediate portion of the boom from the rearward ends of the tractor drawbars. A pair of pins 8 are secured to opposite ends of the angle iron 6, the pins 8 being adapted to be inserted thru corresponding openings formed in the rearward ends of the tractor drawbars. The bars 7 are secured at one end to opposite ends of the angle iron 6, and at the other end to opposite sides of the gusset plate 4. Openings 9 are formed in the ends of the bars 7, the openings 9 being adapted to receive a pin 10 for attachment of the bars 7 to the gusset plate 4. A plurality of openings 11 are formed in the gusset plate 4, the openings 11 likewise being adapted to receive the pin 10. The openings 11 are spaced apart, and the arrangement is such that the elevation of the boom may be adjusted by selectively inserting the pin 10 thru one of the openings 11.

A hook 12 is secured to the upper end of the boom, the hook 12 being joined to the tubular member 1, the reenforcing rod 2 and the gusset plate 3 and being adapted to support a block and tackle (not shown).

A hook 13 is suspended freely from an intermediate portion of the tubular member 1, between the gusset plates 3 and 4, a loop being formed in the shank portion of the hook 13 for use in suspending it from the tubular member 1. The hook 13 likewise is adapted to support a block and tackle (not shown). A plurality of lugs 14 extend upwardly from one side of the tubular member 1. The lugs 14 are spaced apart and are adapted to act as stops to fix the position of the hook 13 with respect to the tubular member 1. The arrangement is such that upon lifting the hook 13 the loop in the shank portion thereof will clear the lugs 14, and the position of the hook 13 with respect to the tubular member 1 may be adjusted by sliding the hook 13 along the tubular member 1 and selectively placing it immediately above one of the lugs 14.

A clevis 15 is secured at its ends to an intermediate portion of the angle iron 6 and may be used as a draft connection or for securely anchoring objects which may be supported from the hooks 12 and 13.

The invention may be modified in various ways without departing from the spirit and scope thereof.

We claim:

A crane including a tubular member adapted to be pivotally secured at one end to the frame of a tractor, a reenforcing rod secured at its ends to the tubular member and supported intermediate its ends by a gusset plate positioned between the tubular member and the reenforcing rod, a horizontal member adapted to engage the rearward ends of a pair of tractor drawbars, a pair of upwardly extending members adapted to connect the ends of the horizontal member to the gusset plate, openings being formed in the ends of the upwardly extending members and corresponding openings being formed in the gusset plate, the openings being adapted to receive a pin to secure the upwardly extending members to the gusset plate, the openings in the gusset plate being spaced apart and the arrangement being such that the elevation of the crane may be adjusted by selectively inserting the pin thru the openings in the ends of the upwardly extending members and one of the openings in the gusset plate.

JOHN H. WALKER.
CLARENCE W. CRENSHAW.

REFERENCES CITED

The following references are of record in the file of this patent:

UNITED STATES PATENTS

| Number | Name | Date |
|---|---|---|
| 83,195 | Middleton | Oct. 20, 1868 |
| 1,558,636 | Rutan | Oct. 27, 1925 |
| 1,729,539 | Davis | Sept. 24, 1929 |
| 1,852,003 | Cummings | Apr. 5, 1932 |
| 1,873,433 | Larsen | Aug. 23, 1932 |
| 2,113,879 | Delalandre | Apr. 12, 1938 |
| 2,433,019 | Arps | Dec. 23, 1947 |
| 2,470,857 | Lathers | May 24, 1949 |
| 2,505,639 | Eaton | Apr. 25, 1950 |